INVENTORS
Martin J. Pierman
Edwin W. Donath
Otto A. Ernst
BY Silverman + Cass
ATTORNEYS Aug. 26, 1969   M. J. PIERMAN ETAL   3,463,003
AIR VELOCITY MEASURING APPARATUS
Filed Aug. 10, 1967   3 Sheets-Sheet 3
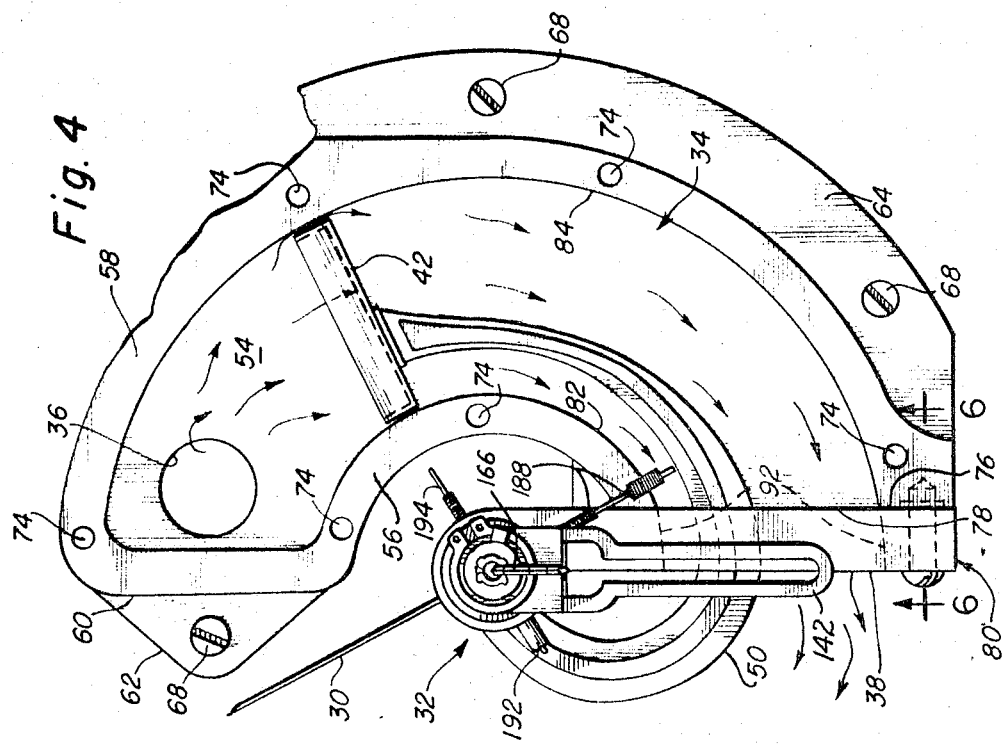
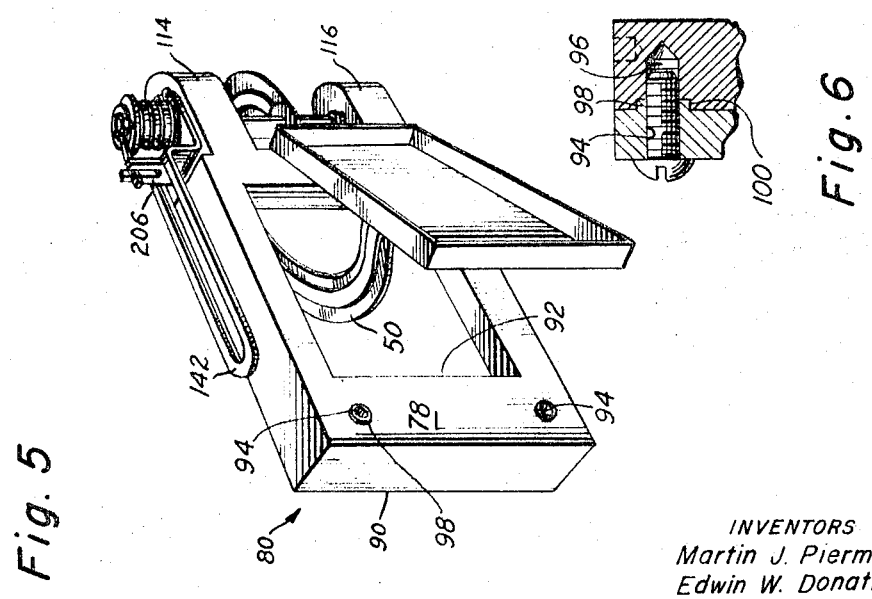
INVENTORS
Martin J. Pierman
Edwin W. Donath
Otto A. Ernst
BY Silverman & Cass
ATTORNEYS United States Patent Office 3,463,003
Patented Aug. 26, 1969

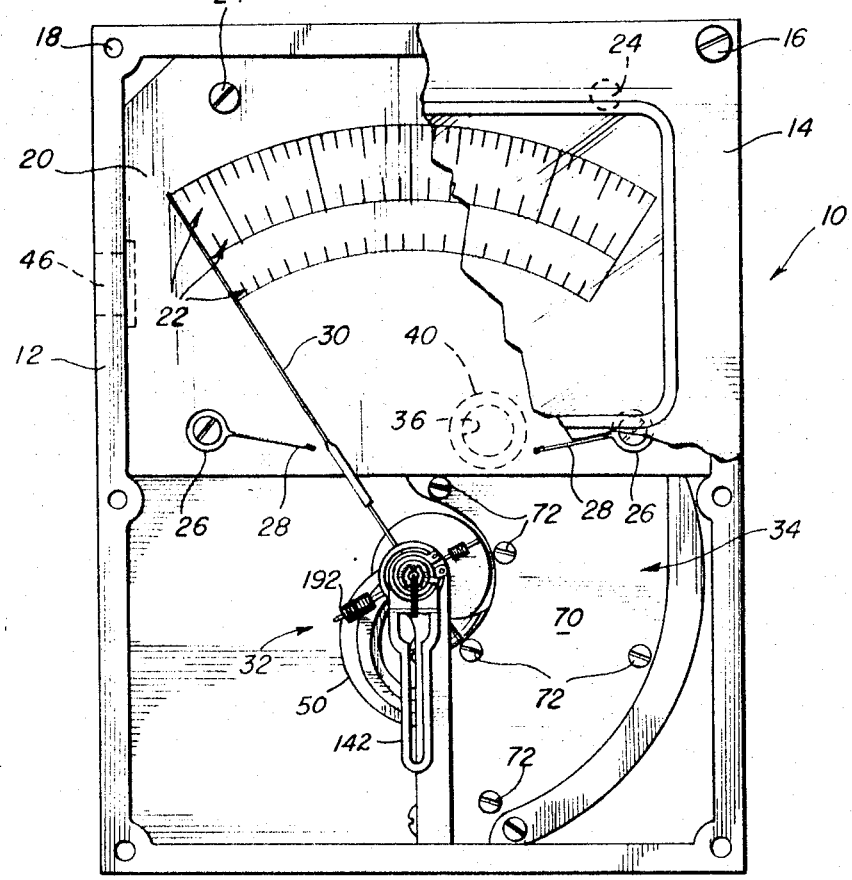

3,463,003
AIR VELOCITY MEASURING APPARATUS
Martin J. Pierman, Mount Prospect, Edwin W. Donath, Arlington Heights, and Otto A. Ernst, Mount Prospect, Ill., assignors to Alnor Instrument Company, Div. of Illinois Testing Laboratories, Inc., Chicago, Ill., a corporation of Illinois
Filed Aug. 10, 1967, Ser. No. 659,710
Int. Cl. G01w 1/02; G01f 1/06
U.S. Cl. 73—189
17 Claims

ABSTRACT OF THE DISCLOSURE

Air velocity measuring apparatus of the type in which a vane is mounted on an axis enabling the vane to swing in a calibrated tunnel so that pressure admitted to the tunnel will tend to move the vane out of the tunnel against a bias thereby swinging a pointer connected to the vane over a suitable scale. The vane being suspended by means of a suitable low friction suspension and the entire suspension including the vane being mounted on an integral mounting member including a frame portion and arms, the frame fitting and being precisely keyed to the front end of the tunnel and being in accurate alignment therewith, the arms seating and supporting the suspension. The delicate movement may be fully assembled and adjusted and the vane aligned with the interior of the frame portion, all independently of the remainder of the meter, and thereafter readily attached to the front of the tunnel so that adjustments are simplified and rendered more economical. The arrangement of removable mounting member enables an air velocity meter to be made with a taut-band suspension to take advantage of its sensitivity and ruggedness, and the preferred structure uses a taut-band suspension of a piston-cylinder-spring construction.

CROSS REFERENCE TO RELATED APPLICATION

The taut band suspension per se which is described herein is disclosed and claimed in a copending application Ser. No. 659,711, filed concurrently herewith, and bearing the title "Taut Band Suspension Meter," the invention represented by the said taut band suspension per se being that of two of the applicants herein named as the applicants of said copending application. Both applications have a common assignee.

BACKGROUND OF THE INVENTION

The type of air velocity meter which is involved in the invention herein is generally well-known as a tool of heating, ventilating and air conditioning engineers and service men. Such meters are likewise useful to designers and research workers, if the meters have sufficient sensitivity. This variety of meter basically comprises a casing containing an accurately constructed tunnel which is arcuate about an axis. The air inlet port comes through the casing wall directly into the tunnel at one end thereof and enables air entering the meter to pass out of the tunnel from the second end or exhaust port. A piston or vane is disposed within the tunnel broadside to the flow aif air, and blocks the tunnel but for a small clearance on all sides thereof. The vane is mounted on a suspension whose axis of rotation is the same as the axis of curvature of the tunnel. The movement of air will swing the vane in the direction of air flow against an opposing force provided by a spring, the amount of swing being a function of the velocity of air. Prior pivot-jewel meters used spiral springs.

A needle is mounted on the suspension along with the vane, and this needle moves over a dial which is calibrated in terms of air velocity. Different ranges are obtained by changing the metering of air flow in the entrance ports and in apparatus used to lead the air to the meter, this aspect of the art not being involved in the invention herein.

The entire suspension, including the needle, vane, arm carrying the vane and all parts thereof must be balanced, statically and dynamically, so that the meter can be used in all positions with the same characteristics.

The tunnel and vane type of velocity meter has always utilized a pivot and jewel type of suspension, in which there is an arbor having pivot ends mounted, respectively, in cupped thrust bearings, in variably formed of hard jewels. So far as is known, there has not been a successful taut-band suspension used in velocity meters, and the reasons for this will be stated below. The invention in one aspect is applicable to any type of suspension, and in a second aspect gives more advantages when the suspension is of the taut-band type.

The construction of prior meters has been somewhat difficult due to a plurality of factors which might be enumerated in order to enable an appreciation of the invention. Such difficulties have caused the prices of such meters to be relatively high, so that the solution of some or all of these difficulties by the invention herein, if only accomplishing the reduction of the eventual price of the meters to the public would be of value. As seen, the solutions proposed by the invention herein provide benefits which are as important, if not more so, than the production of economical meters.

(1) In the construction of prior meters, the most important problem was to obtain careful alignment and tracking of the vane with the tunnel, which was only achieved by precise alignment of the top and bottom ends of the suspension and perfect coincidence of the suspension axis and that of the tunnel. Failing this, the vane would not move through the tunnel in a perfect path; might even touch at places when the slightest strain is placed on the suspension as by shock and manipulation of the meter; and would have characteristics which were not predictable.

As a result, the meters were all tailored by hand, that is, they were assembled and then adjusted and aligned in this condition. Such adjustment and alignment depended upon the skill of the individual workman, and hence tolerances were a matter of individual skill. Accordingly, after the meter had been fully adjusted, it was necessary to calibrate each meter individually for each range, and draw the scales manually to fit the calibrations. Moreover, any accessories which were used with the apparatus had to be involved in individual calibrations, including jets, filters, tubes and fittings. There was little if any interchangeability, and when returning an instrument for repair, recalibration or addition of other accessories, all of the accessories had to be returned.

(2) Prior meters invariably used the pivot-jewel type of suspension. Such a suspension was considered essential because of the absence of substantial lateral deflection of the arbor even in cases of shock. This kind of suspension has disadvantages which are inherent in its use in any kind of instrument, but particularly in the case of a velocity meter. Jewel bearings wear, causing inaccuracies in tracking. They must provide axial positioning which requires close engagement, but this produces drag. They are brittle and will crack upon shock caused by sudden movement, and if this doesn't occur, the pivot end will bend laterally or mushroom. Dropping a velocity meter of this type is likely to cause substantial damage, requiring complete recalibration.

(3) Taut band suspensions require fixtures for holding parts; means to put the supported structure, such as the vane in this case, under tension; and means to solder or weld the filaments in place while under tension and in perfect alignment. Thus, added to the problem of alignment, which is common with the pivot-jewel type of suspension, there is the difficult and expensive procedure of assembly. In the case of the velocity meter, the worker assembling the vane and needle would have to work with the tunnel during assembly of the suspension; would have to align after assembly; would have to assemble the aligned apparatus to the casing and connect the various parts, etc. Any attempt fully to assemble the meter with the tunnel and thereafter mount the suspension would pose even worse problems, since the bottom connection of the suspension would be inaccessible.

A phenomenon which occurs in the use of air velocity meters and is due to the relatively large weight of the moving parts is known as fall-through. This is a large excursion of the vane out of its normal tracking path, and it occurs from time to time during handling of the meter as a result of inertia. The vane clearance is adjusted for a reasonable amount of fall-through without damage. Thus, a ¾ inch square vane in one instrument has a clearance of .020 inch all around its four edges, within the tunnel. This could take care of a substantial amount of fall-through, but this assumes that the vane tracks perfectly. It has been found that a misalignment of the upper and lower axial ends of the suspension, which cannot be avoided in prior devices, results in 0.25 degree off the true axis and causes a yaw or false tracking of the vane which could bring a corner so close to the surface of the tunnel wall that the slightest of fall-through would produce scraping or touching. Damage to the vane, change in calibration, bending or pivots, and many other things may occur as a result.

The taut band suspension is a more rugged type of suspension than the pivot-jewel type and substantially more sensitive. In the accomplishment of the invention herein, these factors provide an air velocity measuring instrument vastly superior to any previously known, with regard to increased sensitivity and resistance to shock. The use of a novel type of taut band suspension involving a piston-cylinder-spring structure makes the instrument highly resistant to axial shock without damage or change of calibration.

DESCRIPTION OF THE PRIOR ART

As will become apparent, the most important aspect of the invention is the construction of an air velocity meter of the vane and tunnel type with an integral mounting member that has a frame portion and suspension supporting arms, which is accurately formed independently of the entire meter including the tunnel, so that the movement may be mounted to the mounting member, adjusted and aligned, and thereafter assembled to the tunnel without anything more than the step of fastening the mounting member in place. Thereafter the tunnel and vane automatically will track. This aspect of the invention is the key to most of the advantages which will be detailed. So far as known, this structure is wholly unique.

The use of the integral mounting member with a pivot-jewel type of suspension provides many advantages not previously achieved, and the claims will have such scope as to encompass this kind of structure, although the maximum of advantages is achieved when the suspension is of the taut band variety, and especially what has been termed the piston-cylinder-spring type disclosed in said copending application.

With the above in mind, the discussion of the prior art will have somewhat more meaning.

Vane type of velocity measuring instruments are used for all gases, these being sometimes termed compressible fluids to distinguish them from liquids, and hence although the description will refer to air, all gases are included. Air is the most common working fluid. Two types of vane instruments are known, those in which the vane rotates and those in which the vane is merely deflected. This invention is concerned only with the latter type of device, called in the prior art piston and cylinder, or as termed herein, vane and tunnel.

A very early vane type of meter was disclosed in U.S. Patent 1,401,887 issued Dec. 27, 1921 to R. H. Davis, this being a structure in which the vane did not function fully to block the conduit for the movement of the gas, but in which the vane was balanced and which moved against the bias of a spiral spring. U.S. Patent 1,788,976 of Jan. 13, 1931 issued to A. Beraud et al. improved the unconfined vane meter by providing a confined piston moving in a cylinder, the entire structure being balanced and suspended by conventional pivot-jewel mountings.

The assignee of the applicants herein has been active in this field for a substantial length of time and has commercially manufactured and sold air velocity meters for several generations, a substantial portion of which being of the vane and tunnel variety. Patents which disclose the structure of many of these devices are 2,060,848 of Nov. 17, 1936 issued to J. R. Boyle; 2,315,185 of Mar. 30, 1943 issued to J. R. Boyle; and 2,690,671 of Oct. 5, 1954 issued to J. A. Obermaier et al. The latter patent discloses the basic structure of the velocity meter of the invention in that it has the same tunnel and vane arrangement, including the general concept of support for the vane at the axis of the arc of the tunnel. The similarity ends with the structure thus described.

With reference to the separation of the mounting for the suspension, one structure of this type has been used by the assignee of the applicants for some time, but this has been in the form of a bracket which attached to the tunnel by means of slotted connections and which lacked the framing part. This gave only the convenience of preassembly, but still required adjustment and alignment for tracking, required bending and repositioning, and required hand-drawn scales and individual calibration. This meant that all of the difficult and delicate work had to be done with the "hardware" in place, that is, with the tunnel connected. After complete adjustment, the screws were sealed against movement, and any breaking of the seals would necessitate a return of the apparatus to the manufacturer.

SUMMARY OF THE INVENTION

The principal object of the invention is to achieve the maximum of sensitivity and durability in an air velocity measuring apparatus, and the way this is done is by having an integral mounting member for suspending the vane which includes a frame portion within which the vane may be aligned and adjusted on the bench independently of the remainder of the apparatus.

Everything that has to be done to assure accuracy, including mounting the suspension, balancing, adjusting and aligning, is done prior to assembly of the mounting member to the tunnel. Thus, the entire meter may be built without concerning one's self that there will be damage to the suspension, and the mounting member screwed home the very last minute.

Aside from ease of assembly and resulting economy, this one aspect of the invention enables the apparatus to be a production item. The scales are printed, everything is totally interchangeable, there is complete uniformity throughout. The vanes all track perfectly, the characteristics don't vary more than a fraction of a percent from meter to meter. The entire line of accessories, jets, fittings, tubes and the like may be manufactured on a production basis. Hand adjustments are eliminated. Even record keeping of the meters sold and their characteristics is simplified.

The advantages described above are achieved irrespective of whether the suspension is taut band or pivot-jewel.

Another important object of the invention is to provide an air velocity measuring apparatus in which the vane is mounted by a taut band suspension to give ruggedness and sensitivity. The improvement of sensitivity over a pivot-jewel meter by the use of the taut band suspension of the invention herein has been over five times. For example, a typical sensitivity would be described as a full scale reading on the most sensitive range for a well-made pivot-jewel suspension air velocity meter of 300 cc. of air per minute, this being a meter intended for laboratory use and being quite expensive. For field use, a typical meter would have a sensitivity of 500 cc. of air per minute for full scale deflection. These two figures represent the deflection without the use of jets to divide the range where the velocity is substantially higher.

A taut band suspension meter constructed in accordance with the invention has considerably more durability, ruggedness and resistance to shock than either of the two above, does not differ substantially in price from the less expensive of the two, yet has a sensitivity at full scale of 80 cc. of air per minute.

The particular type of taut band suspension used provides advantages which are peculiar to the air velocity measuring apparatus. The heavier vane and its balancing weights demand more from the spring suspension to prevent fall-through from causing damage. The installation of such a suspension cannot practically be done without the utilization of the structure of the separable monting member, such that the desirability of a taut band suspension could normally not be achieved in a meter of this type.

The taut band suspension of the piston-cylinder-spring type lends itself to an extremely simplified method of mounting on the arms of the mounting member.

Other objects and benefits will become apparent from the details set forth hereinafter.

BRIEF DESCRIPTION OF THE DRAWINGS

FIG. 1 is a top plan view of an air velocity measuring apparatus in the form of a meter constructed in accordance with the invention, with portions broken away to show some of the details.

FIG. 2 is a perspective view of the tunnel of the meter of FIG. 1 with the assembled mounting member and movement, the vane of the movement being shown at the entrance to the tunnel in a position which normally would represent a substantial flow of air.

FIG. 4 is a fragmentary top plan view of the tunnel, mounting member and movement illustrating the same in a substantially zero condition, that is with no air passing through the tunnel.

FIG. 5 is a rear perspective view of the mounting member and movement illustrating the position of the vane which would be occupied under conditions of substantial air flow but not quite as much as represented by FIG. 2.

FIG. 6 is a fragmentary sectional view taken generally on the line 6—6 of FIG. 4 and in the indicated direction.

DESCRIPTION OF THE PREFERRED EMBODIMENT

Figure 3:
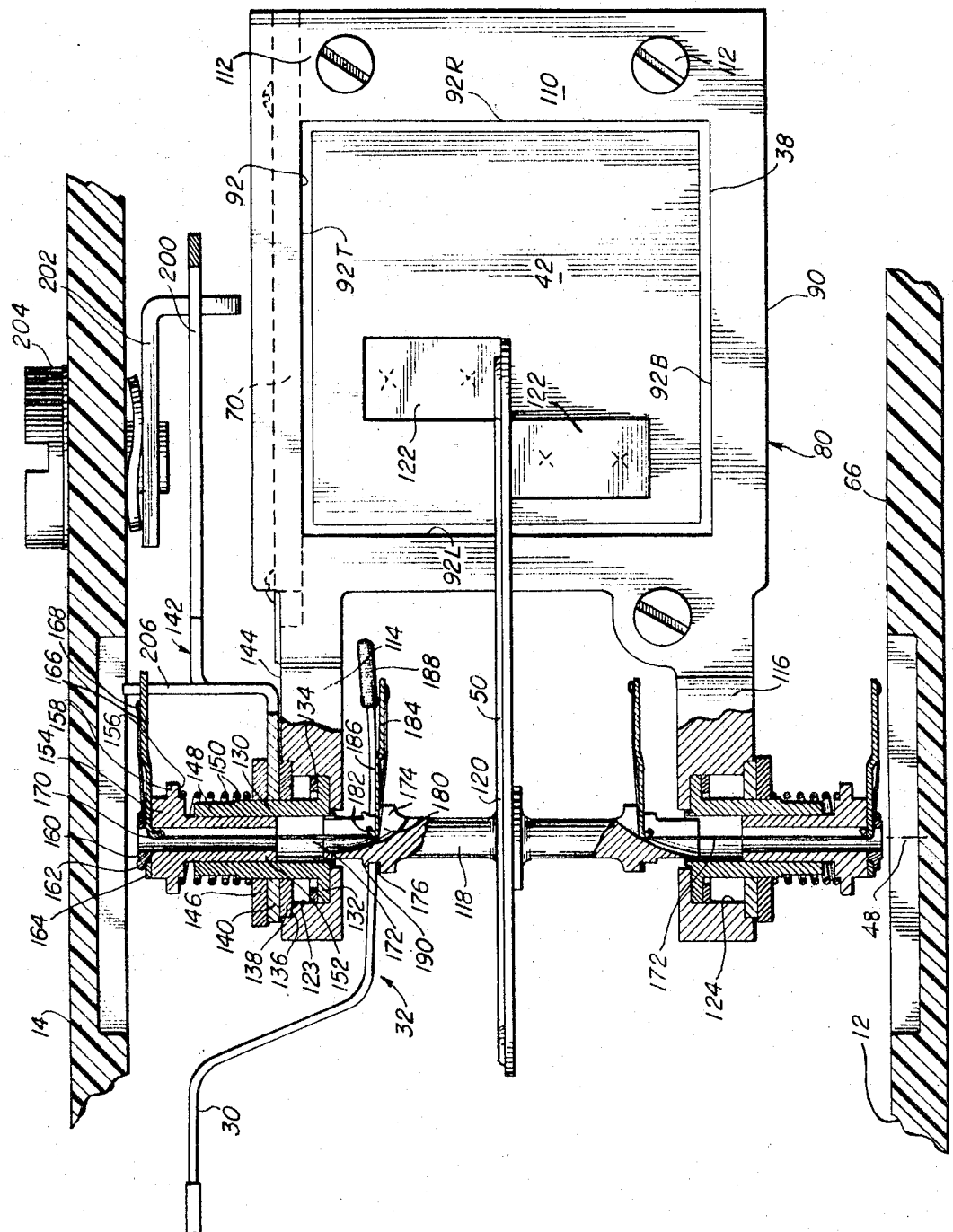
FIG. 3 is a fragmentary sectional view taken through the meter of FIG. 1 generally on the axis of rotation of the movement, with portions shown in elevation to illustrate the relationship of the parts.

As indicated above, the invention is embodied generally in a velocity measuring apparatus especially intended for use in connection with air flow.

In FIG. 1 there is illustrated a meter 10 the general construction of which is of no important significance but which must meet the requirements of an instrument of this kind. For example, since the eventual escape of air from the instrument is effected through the interior itself, such interior must be totally air tight through the use of suitable gaskets, etc. The meter 10 has a casing 12 preferably formed of some high impact resin and a cover 14 held in place by suitable screws 16 entering tapped holes as indicated at 18. A plate 20 having suitable scales 22 printed thereon is secured to the meter casing in any suitable manner such as, for example, by posts (not shown), and the screws 24. Screws 26 hold the plate 20 in place also but have bumpers 28 mounted thereto to limit the swinging movement of a needle 30 driven by the movement. The movement itself generally will be referred to by the reference character 32.

To obtain a general concept of the operation of the meter, reference may be had to FIGS. 1 and 4. The tunnel of the apparatus is designated generally by the reference character 34 and is semi-circular as seen, has an air admission port at 36 and is open to the inside of the casing 12 at the opposite end of the tunnel, this exhaust opening being designated 38. A tightly fitting cover 70 is mounted on top of the tunnel to close it off. Air enters the tunnel 34 in any suitable manner such as, for example by means of a suitable fitting 40 connected directly from the port 36 to the exterior of the meter, for example, through its base, and passes along the arcuate passageway which comprises the tunnel proper in the direction indicated by the arrows of FIG. 4. A vane 42 is mounted for translative movement in the tunnel so that the air impinging against the inside surface of the vane will cause it to move. The air also escapes around the vane to the forward face thereof by way of the clearance designated 44, passes along the tunnel further and out the entrance 38 from which it diffuses throughout the inside of the casing 12 and finds its way out of a suitable exhaust port. Such a port is generally designated 46 in FIG. 1.

The swing of the vane against the resisting bias of the movement 32 represents the velocity of air passing into the port 36, and the meter is calibrated so that the needle 30 reads such velocity, usually in feet per minute and/or inches of water. By providing different connections for the inlet fitting 40, different ranges may be achieved through the use of the meter 10, but a discussion of such techniques is not a part of the invention herein.

Considering the meter movement 32 generally, it may be considered that the vane 42 is mounted for rotation on an axis 48 which is also the axis of the movement. The needle 30 is connected to the movement and will swing simultaneously with the vane 42, because of the arcuate arm 50 connecting the vane 42 with the movement. This general consideration and the construction of the meter 10 as thus far described differs to no substantial extent from the construction of the U.S. Patent 2,690,671 previously referred to. The features of the invention reside in the structure described below.

The tunnel 34 preferably is formed as an accurate die-casting so that its interior dimensions are precise. There is a bottom wall 54 in which the inlet port 36 is formed, an inner cylindrical side wall 56, an outer cylindrical side wall 58, an end wall 60, and suitable flanges such as shown at 62 and 64 to enable the tunnel to be mounted to the bottom wall 66 of the case 12. Mounting screws are shown at 68 at their placement and the arrangement for securing the tunnel are matters of design. The top surfaces of the walls 56, 58 and 60 are accurately formed in a flat plane to enable a completely air-tight cover member 70 to be attached thereto as for example by the screws 72 cooperating with threaded holes 74 formed in the casting.

As previously mentioned, the exhaust end 38 of the tunnel is open and the casting itself has a carefully formed flat planar end surface framing the end of the tunnel at 76. When the mounting member 80 which will be described in detail hereinafter, is in place, the actual exhaust end of the tunnel will be at the opening 38 at the left hand face of said member 80, viewed in FIGS. 4 and 5.

The cyclindrical walls 56 and 58 have their interior surfaces 82 and 84 precisely formed as cylindrical relative to the axis 48 which, as stated, is the axis of the movement 32. Accordingly, the tunnel 34 provides an accurately calibrated chamber which in this case is of rectangular cross section, through which parallel movement of the vane 42 is possible. Suitable bleed means (not shown) is provided to calibrate the tunnel accurately and to adjust the air flow therethrough, the lateral opening in the wall for this purpose being shown at 36.

As previously mentioned the problem connected with building accurate meters of this type relates to the practical difficulty of causing the axis 48 to be precisely coincident with the axis defined by the surfaces 82 and 84. To achieve this end the invention contemplates an integral mounting member 80 including a frame portion 90 and arms which completely carries the movement and the vane arm 50 independently of the tunnel 34. For this reason the end surface of the casting forming the tunneu is accurately formed and perfectly flat as shown at 76. The integral mounting member 80 has a frame portion 90 whose rectangular passageway 92 is an accurate continution of the interior chamber of the tunnel 34 when the frame portion 90 is assembled to the surface 76. The mounting member 80 is keyed accurately to the end surface 76 in any suitable manner, so that the perfectly flat surfaces 78 and 76 are in face-to-face engagement. Preferably as shown in FIG. 5 the mounting member 80 has accurate holes 94 passing through the same in alignment with tapped sockets formed in the casting of the tunnel 34 opening to the end surface 76. One such tapped socket is shown in FIG. 6 at 96. At least two of the holes 94 have protruding pilot projections 98 which are integrally die cast with the mounting member 80, and the tunnel casting has counterbored sockets 100 coaxial with the tapped sockets 96 precisely and accurately to seat the pilot projections 98. In this manner assembling the mounting member 80 to the tunnel is a simple and foolproof procedure.

Since die castings can be made with great accuracy and uniformity, when the mounting member 80 is assembled as described, the passageway 92 is in precise alignment with the tunnel chamber. Specifically, and considering FIG. 3, the right hand face 92R of the passageway 92 is a precise continuation of the cylindrical surface 84; the left hand inner face 92L is a precise continuation of the cylindrical surface 82; the bottom face 92B is a continuation of the planar surface of the bottom wall 54; and the top face 92T is a precise continuation of the upper boundary of the tunnel chamber. In this latter regard attention is invited to the fact that the cover member 70 fits on the top planar surface of the tunnel chamber to close the same so that its lower surface as shown in the FIG. 3 is accurately coplanar with the top surface of the passageway 92.

Although it might be said that the framing part 90 has a rectangular opening in its exterior surface 110, it should be appreciated that the actual passageway 92 is a segment of an annular chamber whose top and bottom surfaces are parallel and arranged in perfectly flat planes, and whose side walls are cylindrical and coaxial. Accordingly the faces 92L and 92R are segments of cylinders, arcuate and coaxial about the axis 48.

Screws 112 are used to secure the mounting member 80 to the tunnel casting with the faces 76 and 78 engaged. The outer surface 110 of the mounting member 80 thereby provides the actual entrance 38 to the tunnel by way of the passageway 92.

The mounting member 80 has a pair of arms 114 and 116 integral with frame portion 90. These arms 114 and 116 provide the accurate means for mounting the movement 32. As previously stated the movement 32 provides the mounting for the vane 42 by way of the arm 50. A vertical arbor 118 has the arm clamped as shown at 120 between suitable flange formations. The end of the arm has a pair of oppositely extending, angularly bent ears 122 secured to the outer surface of the vanes 42. This arm and the vane 42 are formed of aluminum or other light-weight materials and hence aluminum welding techniques may be used. Upper and lower sockets 123 and 124 are accurately cast in the arms 114 and 116 respectively. Such accuracy is easily maintained in diecasting molds which are precisely constructed since the most precise machining operations are ecnomically performed on such molds. If it was necessary, for each meter, to bore sockets such as 122 and 124 in precise alignment to assure accurate alignment of the sockets one relative to the other, and in addition precise coincidence between the axis 48 and the surfaces 82 and 84, the cost of such meters would be prohibitive. Since the meter has the precise keying of the mounting member 80 and since the frame portion 90 is integral with the arms 114 and 116, the meter movement 32 will always be precisely aligned. Accordingly, the movement 32 may be associated with the member 80 independently of the remainder of the apparatus. It will be appreciated that even if the movement 32 is of the pivot-jewel variety, there will be substantial savings and many advantages as previously discussed. Accordingly, the invention has achieved one of its important ends merely by the provision of the demountable, keyed-in mounting member 80 and a movement accurately associated with such mounting member.

The added advantages of the invention follow from the particular mounting disclosed herein as described below.

Reference may be had especially to FIG. 3 for the description and the suspension herein, and as well to the copending application for certain details. This suspension is of the same general type disclosed in said copending application and is mentioned hereinabove as a piston-cylinder-spring type of taut band suspension. The upper assembly of the movement 32 comprises a cylinder 130 having a bottom flange 132 seated in the bottom of the socket 123 and locked in place by a commercial split washer or ring 134. This split ring 134 is of the variety which is biased to expand radially outward so that in order to release it one must compress the washer or ring. At the upper end of the socket 123 there is formed an annular shoulder 136 by means of a suitable counter bore, and an annular washer 138 is set into a resulting gallery. The washer 138 is of such thickness relative to the surface 144 as to enable the foot 140 of a lever arm 142 to be mounted for rotation thereon free of the upper surface 144 of the arm 114. Both the foot 140 and the washer 138 have suitable holes or passageways therethrough to enable the body of the cylinder 130 to pass through the same. Another split washer 146 holds the thus far described structure in assembly, this washer being of the variety which is arranged to contract and thereby clamp itself around the surface of the cylinder 130. To release, one expands the washer. Both of the washers 134 and 146 may be of a type known as "Truarc."

The cylinder 130 has a decreased diameter section 148 whose purpose is to clear the helical coiled spring 150 mounted coaxially with the cylinder and engage against the upper surface of the washer 146 as shown. A piston 152 is mounted on the interior of the cylinder, being telescopic within the cylinder and having an end cap 154 providing a seat 156 for the upper end of the spring 150 by reason of a flange 158 integral with said end cap. The end cap 154 has a projection 160 which is swaged at 162 upon a ring 164, this ring having lateral arm 166 to which is welded or soldered a high tensile strength fiber as shown at 168. A stiff cantilever radial arm 170 formed on the interior of the ring 164 guides the filament 172 along the axis of the piston 152 and the cylinder 130. The arbor or shaft 118 has a shoulder 174 formed thereon, this shoulder being provided with a ring 176 whose construction is substantially the same as the ring 164. A slot 180 formed in the upper enlarged end of the shaft 118 provides the clearance for the lower end of the filament 172 and its support from the radial arm 182. In other respects the ring 176 and its arm 184 are identical to those of the ring 164 and its arm 166.

A quadrant 186 of generally conventional construction has the needle 30 secured thereto and balanced by counterweights as shown at 188. Such a quadrant will have the ring formation readily clamped in place coaxially with the ring 176 by suitable staking of the upper end of the shaft 118 as shown at 190. In FIG. 3 the view is not as actually oriented since the quadrant 186 will have the needle 30 at approximately a 90° angle relative to the vane 42, and will have a relatively large weight 192 directly opposite the vane 42 for balancing the vane. FIG. 4 shows this best. 194 is an adjusting arm and weight to balance the vane 42 against the weight 192.

Obviously the entire movement is balanced statically and dynamically by suitable adjustments and as previously understood, this can all be done with the mounting member 80 completely free of the tunnel and any other parts of the meter.

The lower assembly of the movement 32 is substantially identical with the one just described in detail, and hence there is no need to proceed further with the same. The cover member 14 and the lower wall 66 of the casing 12 may have suitable cavities formed therein as shown in FIG. 3 to provide clearance for the end assemblies of the movement 32.

Referring now to the arm 142, this enables zero adjustment of the meter. The right hand end of the arm 142 is slotted as at 200 and a bracket 202 mounted on a screw 204 which may be manipulated from outside of the cover member 14 enables the bracket 202 to be rotated to cause the arm 142 to swing. A bifurcated projection 206 straddling the arm 166 will enable twisting of the upper filament 172 to provide the adjustment desired.

As understood the filament 172 and its counterpart at the bottom of the movement (FIG. 3) are mounted under great tension. The arms 170 and 182 and their counterparts are relatively stiff, all of the shock-resistance of the movement being achieved through the use of a helical spring 150 and its counterpart. Great sensitivity is achieved by this arrangement and in addition the meter 10 is very rugged and durable.

It will be appreciated that assembling a taut band movement 32 would be extremely difficult if not totally impractical if one were required to handle the tunnel casting and/or the remainder of the meter, or to assemble a large and heavy structure with a taut band movement attached. According to the invention as described it is feasible to assemble the entire taut band movement 32 to the mounting member 80 independently of the meter and thereafter precisely assemble the same to the meter by the keying means which have been described.

Obviously considerable variation may be made in the invention without departing from the spirit or scope thereof as defined in the claims which follow.

What it is desired to be secured by Letters Patent of the United States is:

1. An air pressure measuring apparatus, comprising
   (A) a tunnel-forming structure having an arcuate tunnel therein whose interior side surfaces are portions of coaxial cylinders and whose interior upper and lower surfaces define parallel flat planes normal to said axis, the tunnel having an air-stream entrance port at one end, its other end being open to provide an exhaust port for discharge of air from said tunnel,
   (B) a meter movement having an indicator,
   (C) a vane secured to the movement and disposed within the tunnel substantially to block air movement in the tunnel but clearing the surfaces on all sides to enable swinging thereof, the vane having an arcuate arm connected to the movement by way of the exhaust port,
   (D) means mounting the movement to provide rotation of said vane on said axis, and the movement including resilient biasing means to resist swinging of the vane due to air impingement upon said vane,
   (E) said tunnel-forming structure comprising
      (i) a body providing the principal of said tunnel,
      (ii) an integral mounting member assembled in accurate connection to said body, and having
         (a) a frame portion with a passageway therethrough of configuration to be a continuation of said tunnel and providing said exhaust port,
         (b) support means extending to said axis and constituting said meter mounting means,
   (F) and a calibrated scale cooperating with said indicator to indicate the degree of movement.

2. Apparatus as claimed in claim 1 in which the support means comprise a pair of arms spaced apart in the direction of said axis and having the said movement suspended therebetween.

3. Apparatus as claimed in claim 2 in which said arms have respectively oppositely opening aligned sockets, said movement includes anchoring means at the ends thereof and said anchoring means are seated in the respective sockets.

4. Apparatus as claimed in claim 1 in which the body and mounting member are provided with interengaging surfaces and keying means to effect said accurate connection.

5. Apparatus as claimed in claim 4 in which said keying means comprise annular projections on one of said body and mounting member and cooperating counterbored sockets for receiving said projections on the other of said body and mounting member.

6. Apparatus as claimed in claim 5 in which said mounting member is secured in place by mounting screws passing through said framing portion and into threaded sockets formed in said body, respectively coaxially of at least two of said cooperating projections and counterbored sockets.

7. Apparatus as claimed in claim 4 in which said mounting member is secured in place by mounting screws passing through said framing portion and into threaded sockets formed in said body.

8. Apparatus as claimed in claim 1 in which said meter movement is a taut band suspension movement.

9. Apparatus as claimed in claim 8 in which the support means comprise a pair of spaced apart arms, said movement includes a cylinder fixed to each arm, a hollow piston telescopically engaged in the cylinder and having a filament connected thereto and passing coaxially thereof, a central arbor connected between the filaments, and said arcuate arm being secured to said arbor, and helical coiled springs urging the pistons away from one another to place tension on the filaments, said resilient biasing means comprising at least said filaments when tensioned.

10. Apparatus as claimed in claim 9, in which each arm has an annular cavity formed therein, coaxially aligned and opening in opposite directions, and each cylinder is secured in a respective cavity.

11. Apparatus as claimed in claim 9 in which each coiled spring surrounds a cylinder, each piston has an end cap external of its associated cylinder, and the helical spring associated with each piston and cylinder assembly is seated between said end cap and the arm mounting the cylinder of the respective assembly.

12. Apparatus as claimed in claim 9 in which each piston has an external end cap, and each end cap has a radially inward and a radially outward extension, the filament being secured to the radially outward extension and being guided and positioned at said axis by said radially inward extension.

13. An air pressure measuring apparatus, comprising
   (A) a tunnel-forming structure having an arcuate tunnel therein whose interior side surfaces are portions of coaxial cylinders and whose interior upper and lower surfaces define parallel flat planes normal to said axis, the tunnel having an air-stream entrance port at one end, its other end being open to provide an exhaust port for discharge of air from said tunnel, (B) a meter movement having an indicator, (C) a vane secured to the movement and disposed within the tunnel substantially to block air movement in the tunnel but clearing the surfaces on all sides to enable swinging thereof, the vane having an arcuate arm connected to the movement by way of the exhaust port, (D) means mounting the movement to provide rotation of said vane on said axis, and the movement including resilient biasing means to resist swinging of the vane due to air impingement upon said vane, (E) a pair of arms secured to said tunnel-forming structure and having their ends aligned with said axis and spaced apart, (F) said meter movement comprising an arbor having the vane arm attached thereto, a filament connected to each arbor end and resiliently anchored to the respective arm ends.

14. The apparatus as claimed in claim 13 in which the resilient anchoring is provided for each filament end by a hollow piston-cylinder-spring assembly, the cylinder being secured to an arm end and having its piston telescoped therein and urged outwardly thereof by a helical coiled spring surrounding the cylinder and engaged between said arm end and a piston end, the filament being attached to said piston end.

15. The apparatus of claim 14 in which each arm end has an outwardly opening socket and each socket has one of said cylinders removably secured therein.

16. An air velocity measuring apparatus comprising (A) an arcuate tunnel having interior side surfaces, which are portions of cylinders of common axis, interior upper and lower surfaces which define parallel planes normal to said axis, an air-stream entrance port at one end of said tunnel, and an exhaust port at the other end of said tunnel;

(B) a meter movement;

(C) a vane pivotally secured to the movement for disposition within the tunnel to block air flow therethrough, and an arcuate arm connecting the vane to the movement by way of the exhaust port; and (D) a meter movement mounting member constructed for especially accurate connection to said tunnel at said exhaust port, said mounting member having a frame portion with a passageway therethrough of configuration to be a continuation of said tunnel, and meter support means extending to said axis.

17. An air velocity measuring apparatus comprising (A) an arcuate tunnel having interior side surfaces, which are portions of cylinders of common axis, and interior upper and lower surfaces which define parallel planes normal to said axis, an air-stream entrance port at one end of said tunnel, and an exhaust port at the other end of said tunnel;

(B) a taunt band suspension meter movement;

(C) a vane pivotally secured to the movement for disposition within the tunnel to block air flow therethrough, and an arcuate arm connecting the vane to the movement by way of the exhaust port; and (D) a meter movement mounting member constructed for especially accurate connection to said tunnel and having a pair of arms spaced apart along said axis for having the movement suspended thereto.

References Cited
UNITED STATES PATENTS 2,691,142 10/1954 Richardson _____ 324—154 X
3,242,730 3/1966 Peltola _____ 73—228

RICHARD C. QUEISSER, Primary Examiner

J. W. MYRACLE, Assistant Examiner

U.S. Cl. X.R.
73—228